Patented Dec. 15, 1942

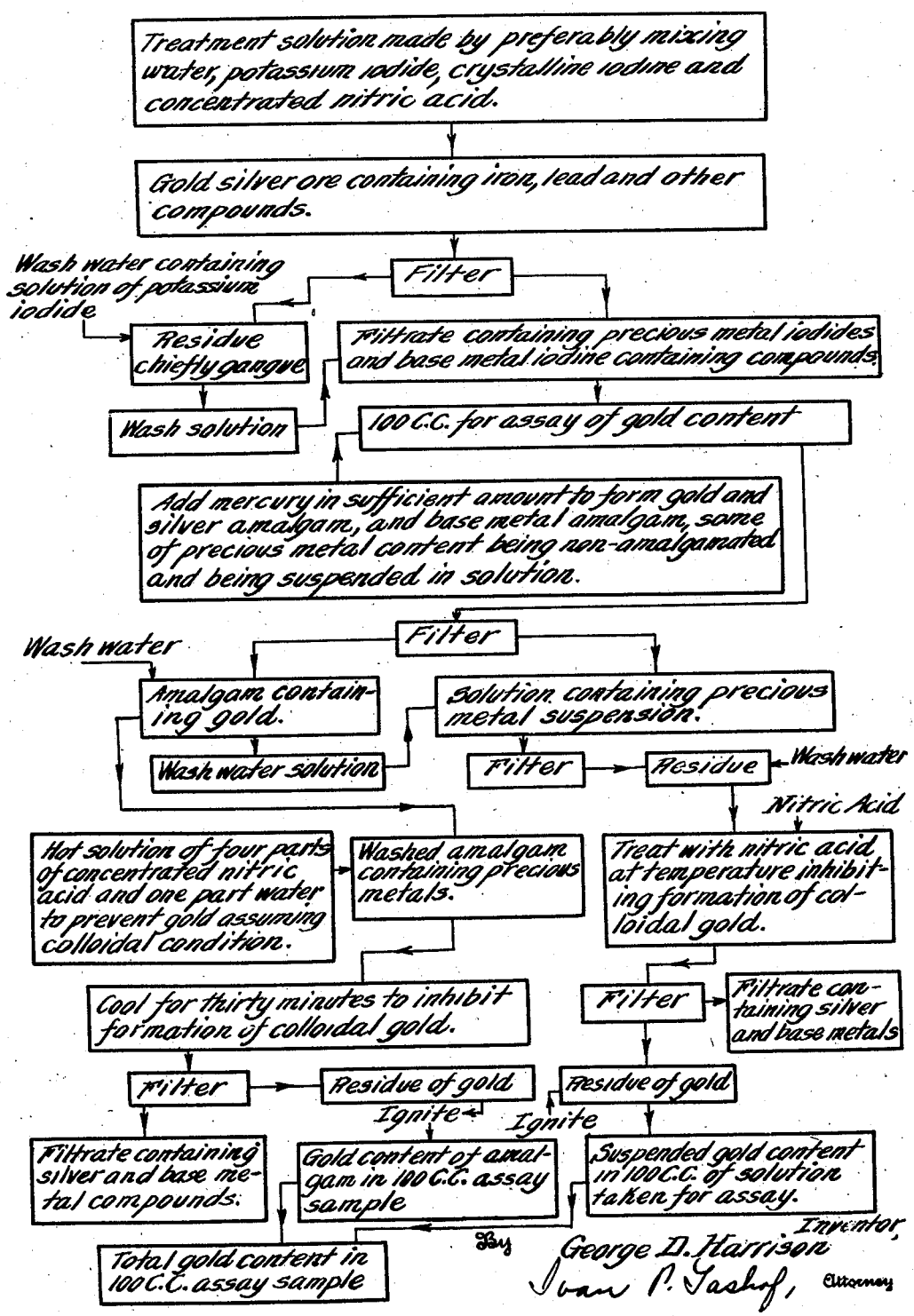

2,304,823

UNITED STATES PATENT OFFICE 2,304,823

METHOD OF TREATING ORE AND TREATMENT AGENT THEREFOR

George D. Harrison, Detroit, Mich., assignor to Thomas M. Courtis and Walter F. Courtis, both of Detroit, Mich.

Application July 3, 1940, Serial No. 343,904

19 Claims. (Cl. 75—118)

The present invention relates to the treatment of materials to recover therefrom their precious metal and base metal contents. While the invention is capable of general application, it is highly useful and finds specific application in the treatment and assaying of ores in which the gold is present in a free state. Further, the invention may be used for the treatment of materials of a very refractory nature, as for example refractory gold and silver ores, although the invention in its broadest form may be used for the treatment of bullions, mattes, speisses, slags, retort sponges, dental scrap containing gold, platinum, palladium, elements of the platinum group, and silver and jeweler's scrap.

The present invention resides not only in the particular method employed, but also in the particular treatment menstrum and involves the extraction of the valuable components of ores including highly refractory ores which can not be successfully treated as far as known by the hitherto used treatment mediums.

In view of the character of the treatment medium herein set forth, it is possible to treat ores including extremely refractory ores without any preliminary treatment step, such as roasting. The present invention is particularly valuable in the treatment of sulfide, telluride and selenide ores, and particularly telluride ores which are found at Cripple Creek, Colorado, said ores having present precious metal minerals such as hessite, petzite, calaverite, silvinite, and the like. In addition, there is present in these ores base metal minerals such as marcasite, pyrite, copper sulfide, copper tellurides, and other base metal tellurides, the gangue of the ore being predominantly granite.

While the Cripple Creek ores vary considerably in their precious metal and base metal content, a typical analysis of the Cripple Creek ore is as follows:

| | | |
|---|---|---|
| Iron | per cent | 12 |
| Copper | do | ½ |
| Tellurium | do | 2 |
| Selenium | do | ¾ |
| Gold (per ton) | ounces | 4 |
| Silver (per ton) | do | 20 |

Such ores may vary in gold content to a value as high as 350 ounces per ton or greater.

While the present invention will be illustrated in connection with the assaying of a Cripple Creek ore, it is desired to specifically point out that the present invention is capable of application to sulfide ores, lead zinc ores, copper zinc ores, iron ore containing precious metal as typified by the Cuban ores, copper peacock ores of the northwest section of the United States, platinum ores, platinum concentrates, tungsten ores, titanium ores, and placer concentrates.

When the material being treated, as for example an ore, contains in addition to free gold, combined gold, the novel treatment agent of the present invention comprises in its broadest form iodine, together with a substance in which the iodine is soluble in the presence of a solute, the latter being in the preferred form of the invention water, although a non-aqueous solvent such as an organic solvent may be used; together with an agent acting to prevent the production of insoluble salts of gold. Preferably, there is also present in the treatment agent hydriodic acid. In its more limited form the treatment medium may contain a metal iodide, as for example an alkali metal iodide which is typified by potassium iodide, and an agent functioning to prevent or inhibit the production of insoluble salts of gold may be a metal nitrate, it being preferred to use an alkali metal nitrate as exemplified by potassium nitrate. In the most limited form, the novel reagent of the present invention may be produced by compounding an aqueous solution of potassium iodide, crystalline iodine, and nitric acid.

It is clear from the above that the treatment mixture contains as one of its essential components an agent acting to prevent or inhibit the production of insoluble salts of gold which, as will be more particularly pointed out later on, result in inaccurate assays or incomplete recovery of the gold.

When the material being treated, be it either an ore or any other material such as a scrap material, has the gold present in a free state, the novel treatment agent above set forth in its broad and limited form may be used to treat such material, subject however to the limitation that it is not necessary that hydriodic acid be present in the treatment medium, since the primary function of the hydriodic acid is to attack refractory compounds of gold, and these are absent or substantially absent in a free gold material, exemplified by a free gold ore. However, it is desired to point out that the treatment agent does, when treating a free gold material, have present an agent acting to inhibit the production of insoluble salts of gold and in the presence of this agent, as for example an alkali metal nitrate or the like, mortaring is not necessary. It may be stated that the alkali metal nitrate of the novel treatment agent which is the subject matter of the present invention may be present in the material being treated, or may be in situ formed from the material being treated, or by a combination of chemical reactions between the treatment agent in which no alkali metal nitrate per se is present and constituents present in the material being treated.

It is desired to further point out that although it has been proposed to treat ores and similar materials with iodine containing treatment agents, as far as known these methods have not been successful from the standpoint of the recovery of the gold content of the material or ore treated. For example, it is proposed in Pritchard Patent No. 861,535, granted July 30, 1907, to treat or assay ores by subjecting the ore to the action of an excess of a solution of iodine dissolved in potassium iodide in an aqueous solution, and then after the ore has been acted on for a sufficient length of time the resulting solution is separated from the pulp. To the solution containing certain iodides, including auric iodide, there is added mercury. The mercury functions to reduce the gold in solution to a metallic state, whereupon the gold immediately forms an amalgam. This amalgam is then washed to free it from the solution.

In such a process there is always present after precipitation with amalgam fine gold particles of a colloidal nature which are suspended in the solution, and when the solution is removed from the mercury, said solution contains colloidal gold particles which are not amalgamated and which in the Pritchard method are entirely lost, thereby producing an extremely inaccurate assay, the latter being inaccurate in some cases to the extent of 75%. In other words, there results in some cases only a 25% recovery.

In accordance with the present invention, the disadvantages of the above referred to process are entirely eliminated. This may be accomplished by treating the material having a precious metal content, including gold, and which is adapted to be brought into solution with an iodine containing treatment agent, said material upon treatment with said agent forming a solution of iodine containing compounds of the precious metals, including gold. This solution is treated in the more specific form of the invention with mercury, whereupon there is produced an amalgam having present a portion of the precious metal content, including gold, of the material being treated, and a suspended precipitate containing the remaining portion of the precious metals, including gold, in a non-amalgamated condition. The previous metal content of the amalgam and of the suspended precipitate are recovered in any suitable manner, but preferably by the specific method hereinafter set forth.

It is desired to point out that in the above aspect of the present invention, it is not necessary to use the novel treatment agent of the present invention. In other words, where it is desired to use mercury to produce an amalgam of the fine gold, and there results in addition a suspended precipitate of fine colloidal gold, as above set forth, the treatment agent may be any iodine containing treatment agent which will bring the precious metal components and/or the base metal components into solution. In other words, it is entirely feasible to use a solution of iodine dissolved in potassium iodide in treating materials such as above referred to and further, the prior art iodine containing treatment agents may be used where later on during the process mercury is used to form an amalgam of the fine gold and the suspended precipitate of colloidal fine gold is recovered as herein set forth. More specifically, any of the prior art iodine containing treatment agents may be used when the material or ore or the like contains the gold or other precious metal component in a free state, or has been treated to reduce the metal to a free state. However, where the material is a refractory material such as a refractory sulfide, telluride, or the like, then it is desirable, if not absolutely necessary, to use the novel treatment agent of the present invention containing an agent which will function to attack the refractory gold compound, this being exemplified by hydriodic acid, although other iodine compounds may be used for this purpose, together with an agent acting to prevent the production of insoluble salts of gold, this being exemplified by potassium nitrate, lithium nitrate, sodium nitrate and the like.

In the specific form of the invention there may be substituted for the potassium iodide, aluminum iodide, sodium iodide, lithium iodide, magnesium iodide. In fact, any iodide may be used in which iodine is soluble in the presence of an aqueous medium or an organic medium such as carbon bisulfide, carbon tetrachloride, kerosene, alcohol, paraffin base oils, chlorinated hydrocarbons such as ethylene dichloride and the like, which are generally used as organic solvents of iodine. In short, any organic solvent of iodine may be used. The above are set forth by way of illustration, and not by way of limitation, it being clear that the iodine containing treatment agent may assume many forms and still come within the spirit of the present invention.

As pointed out, a distinguishing feature of the present invention resides in the complete recovery of the precious metal contents of the material treated and especially gold, this being brought about by digesting the material with an iodine containing treatment-agent, adapted to bring the precious metal content including gold into solution to thereby produce a solution containing the precious metal components including gold, said solution being treated in such a manner that in the preferred form of the invention the complete precious metal content is recovered. Although in one form of the invention it is desired to treat the solution with mercury to form a mercury amalgam together with occlusions and a solution which contains a finely suspended precipitate of colloidal gold, the solution resulting from treatment with an iodine containing compound may be subjected to treatment with materials other than mercury, as for example zinc.

The following specific example illustratively sets forth the present invention. An ore such as above set forth is reduced to a finely divided state, as for example 200 to 300 mesh, and then without any preliminary roasting step digested with a specially prepared treatment agent, as will hereinafter be set forth more in detail. More specifically, to one pound of the ore, or 453.5 grams, there is added 4½ liters of the treatment solution made by mixing 4000 c. c. water, 3800 grams potassium iodide KI, 1900 grams crystal iodine, and 450 c. c. concentrated chemically pure nitric acid.

It is desired to set forth that it is preferable to prepare the treatment solution in the following manner: add solid potassium iodide to the water, then add the crystals of iodine; and then agitate until the potassium iodide and the iodine crystals are completely dissolved. Thereafter, add chemically pure concentrated nitric acid, the latter being added in small increments with simultaneous agitation. The reaction mixture contains potassium iodide, hydriodic acid, free iodine and potassium nitrate, and it is this reaction medium which represents the specific novel treatment agent used in the present process and functions to completely dissolve all tellurides and selenides, and sulfides of gold present in the material being treated. Instead of preparing the treatment medium, as above set forth, a mixture of hydriodic acid, iodine, water, potassium nitrate and potassium iodide may be prepared and used.

It may be pointed out that it is quite desirable that the treatment mixture contain an agent acting to prevent the production of insoluble salts of gold which are insoluble in the usual iodide and iodine solution previously used in the assaying of ores and like products. Where the double salt of gold forms, it produces a crust on the surface of the particles containing gold and prevents solution of these particles in the treatment agent. In many cases, attempts have been made to overcome this difficulty by mortaring the product during digestion of the ore with the treatment agent, so as to remove the insoluble crust formed by the treatment agent. By use of the present invention this is prevented.

It is to be noted that the treatment medium also contains as one of its constituents hydriodic acid. This material functions to bring the precious metal tellurides, selenides, and sulfides into solution in the treatment medium. Thus, by using an iodine containing treatment medium having present iodine, a substance in which the iodine is soluble in the presence of a solute and an agent acting to prevent the production of insoluble salts of gold, the precious metals are brought into solution or at least partially brought into solution. In the more specific form of the invention, the composite aqueous treating medium contains, as set forth, hydriodic acid, potassium nitrate, potassium iodide and iodine, and by the use of such a solution the gold and silver tellurides, selenides, sulfides, and similar refractory gold and silver combinations are brought into solution, this being facilitated by the presence of hydriodic acid, although the presence of a metal nitrate as typified by potassium nitrate and the presence of some free nitric acid may assist in the solution of the refractory materials above set forth. The metal iodide as exemplified by an alkali metal iodide, usually potassium iodide, also functions to dissolve the silver iodide which is insoluble in water.

It is desired to point out that one of the functions of the metal iodide is to dissolve the iodine crystals, and therefore there may be substituted for the solution, aqueous or non-aqueous of the metal iodide, any of the prior art mediums in which iodine is soluble, as for example an aqueous solution of hydriodic acid. In that case, the hydriodic acid may perform two functions, namely act to dissolve the iodine and to attack the refractory gold and silver compounds; and therefore a sufficient quantity of the hydriodic acid must be present to accomplish this purpose when it is desired that it function in its combined capacity. For example, when treating a free gold ore, or a refractory ore, the treatment solution may be water plus hydriodic acid, plus iodine. When using such a solvent, the hydriodic acid will also function to prevent the formation of insoluble double salts of gold, inasmuch as there are no alkali metal iodides present to form the alkali metal double salt of gold which is insoluble. In other words, in accordance with the present invention, the treatment agent modified as suggested, even though it has present iodine containing compounds, will not form with the gold present in the material being treated insoluble double salts.

It is further desired to point out that in accordance with the present invention, instead of using a metal iodide for the solution of the iodine, the iodine may be dissolved in any of the organic solvents in which it is soluble, including those hereinbefore mentioned, and in that case the metal iodide is absent from the formula. In other words, where in the present disclosure it has been stated that a metal iodide is present in the treatment agent, there may be substituted for the present metal iodide any organic or inorganic substance in the presence of which the iodine is soluble. For example, in the treatment agent herein set forth, the iodine may be dissolved in carbon bisulfide, carbon tetrachloride and the like.

As stated, to one pound of ore of the character set forth, there is added 4½ liters of the treatment solution above set forth, and the mixture is agitated for one hour in the absence of any substantial aeration. By this treatment, the precious metals are brought into solution as iodides, together with the iron, copper, tellurium, selenium, and other base metals present, the latter also being in solution as iodine compounds. The reaction mixture is filtered, and as a result there is produced a solution containing the constituents above set forth, together with a residue consisting mostly of the gangue components of the ore together with some values. This residue is washed with a concentrated solution of potassium iodide and water to dissolve the insoluble silver iodides, and the wash water is mixed with the solution containing the soluble precious metal iodides and other base metal iodides.

It is desired to point out that the ratio of 4½ liters of treatment solution to a pound of ore will dissolve all of the silver present in an ore that contains 10 ounces or less of silver per ton. Therefore, since the ore being treated contains 20 ounces of silver per ton, only a part of the silver present will be dissolved in the treatment agent, and there will be present in the residue after filtration an insoluble silver iodide. Provision must be made to dissolve this silver iodide, and therefore, the residue is thoroughly washed with a concentrated aqueous solution of potassium iodide and water until all of the insoluble silver iodide has been brought into solution, this being evidenced by the absence of the characteristic yellow precipitate of silver iodide.

At this point, it is desired to state that the treatment solution may be made up with sufficient potassium iodide to dissolve substantially all of the silver present in the ore being treated, bearing in mind that with an increase of potassium iodide, usually the water content of the treatment solution must be increased. At this point, it is desired to state that since the function of the potassium iodide is not only to dissolve iodine, but to dissolve silver iodide, the treatment solution may be made up with a sufficient quantity of potassium iodide to dissolve more than 10 ounces of silver per ton present in the ore.

The washings containing dissolved silver iodide are thoroughly mixed with the solution containing the precious metal and base metal iodides or iodine-containing compounds. It is this solution which is tested and/or assayed for its precious metal-content, and if desired its base metal-content. In order to assay or test this solution, 100 cc. of the same is taken, and there is added thereto one cc. of C. P. mercury. A portion of the precious metals will unite with the mercury to form a mercury amalgam upon precipitation by the mercury. When the mercury is added to the solution containing the iodides, the mercury reacts with both the gold and silver iodides to produce mercury and silver compounds of iodine, and free gold and free silver. The mercury is used in a sufficient quantity to precipitate all of the gold-content and all of the silver-content of the solution, the silver-content appearing as metallic silver and precipitated silver iodine-containing compounds. The mercury also precipitates some base metal compounds. The iron is partially precipitated from the solution as an insoluble compound, due to the saturation of the solution with mercury; and the copper is completely precipitated from the solution as an iodine compound of copper or compounds of copper, due to its low solubility in the solution. The mercury is present in sufficient quantity to precipitate the tellurium and selenium from solution partly in the form of iodides and partly in the form of metallic selenium and metallic tellurium.

While a portion of the precipitated gold and silver does form a mercury amalgam, the remaining portion of each is not amalgamated but appears and stays in the solution as a finely divided precipitate composed of metallic gold, gold compounds of tellurium and selenium, and silver compounds; and quite frequently adhering to or occluded in this finely divided precipitate are finely divided particles of mercury and/or mercury compounds of iodine. This precipitate is so extremely fine in character as to approach a colloidal condition, which inhibits or prevents its removal by decantation.

The amalgam has amalgamated therewith precious metals, and occluded on its surface may be gold, silver and the like, together with mercury, tellurium, selenium and copper compounds of iodine.

After the mercury has been added to the solution containing the precious metal and base metal constituents, it is highly desirable, if not absolutely necessary in some cases, to agitate the mixture of the solution and the mercury present therein until there is no further color change in the reaction mixture. When that occurs, all of the gold and silver present is precipitated from the solution. It is desired to point out that the pregnant solution carrying the dissolved precious metals and base metals before treatment with mercury will have a red color, and after treatment with mercury and upon complete precipitation of the gold and silver will be nearly colorless, if not completely colorless. The colorless or nearly colorless condition of the solution is due to the absence of any free iodine or hydriodic acid in the solution.

The solution with its suspended precipitate is removed from the precious metal amalgam and occlusions by decantation or any other equivalent means. The mercury amalgam and occlusions are carefully washed with water to remove any traces of solution, and the wash water is then added to the decanted solution and its suspended components.

The so-treated amalgam is thereafter digested at a temperature not to exceed 160° F. in 30 c. c. of a mixture of 4 parts by volume of concentrated C. P. nitric acid and one part water, and then set aside to cool for thirty minutes. The gold residue remaining after the digestion and upon cooling is separated by filtration from the treatment mixture. The filtrate contains base metals and silver as soluble nitrate compounds. The nitric acid, while highly concentrated, has been slightly diluted, and is of such a strength as to prevent the gold assuming a colloidal condition where upon filtration it is lost.

At this time, it is desired to point out that the best method for separation of the gold from the soluble nitrate compounds is to remove the gold by filtering on a very fine ashless filtering paper medium. This filter paper containing gold should be very carefully washed with a dilute solution of nitric acid in water, and then ignited, whereupon the ignited residue may be weighed in as gold. It has been stated that the amalgam after digestion with the concentrated nitric acid is set aside for a period of thirty minutes to cool. The purpose of cooling is to inhibit or entirely prevent the formation of colloidal gold which will pass through the filter paper, and therefore produce inaccurate assay results. It is, therefore, obvious that the thirty minute period is set forth by way of illustration, and not by way of limitation. The time of cooling will depend upon the character of the gold ore being treated, its gold content, the physical and chemical condition of the reaction mixture, and the malgam obtained by precipitation.

The nitrates of the base metal and silver obtained by the digestion of the amalgam may be treated by any of the well known methods to recover the metal-contents thereof.

As stated, upon treatment of the reaction-mixture with mercury, in addition to the amalgam there results a solution containing a suspended precipitate. This solution is filtered through an ashless filter paper to produce a residue containing a finely divided precipitate, as previously described. This residue is washed repeatedly with water to remove all traces of the solution, and thereafter ignited in a small porcelain casserole. After cooling, there is introduced into the casserole 15 c. c. of concentrated C. P. nitric acid, together with 3 c. c. of water. The treatment with the concentrated nitric acid is effected at a temperature not to exceed 160° F. in order to inhibit or prevent the formation of colloidal gold. This treatment-solution dissolves all of the residue with the exception of the finely divided gold. After cooling, this nitric acid solution is filtered through an ashless filter paper on which appears the metallic gold. The filter paper is ignited and the gold content weighed. This gold content, together with the gold derived from the amalgam, is representative of the amount of gold obtained only from that portion of the solution used and will have to be multiplied by its proportion to the total solution in order to ascertain the amount of gold-content in a pound of ore treated. If it is desired, the residue consisting of the ash and gold from both of the above described ignitions may be combined, wrapped in lead foil and cupelled, and the resulting button of gold again digested with nitric acid, removed from the acid, dried and weighed.

In order to determine the amount of silver present in the ore and soluble in the treatment agent, another 100 c. c. of the filtrate resulting from treatment of the ore with the reaction mixture comprising potassium iodide, iodine, water and nitric acid, is taken and there is added to the said sample a sufficient quantity of zinc to precipitate the compounds present as metallic iron, copper, selenium, tellurium, gold, silver and the like, and leave zinc in excess.

To recover the silver from the reaction mass, the latter is filtered and the residue after being thoroughly washed is digested with a dilute solution of nitric acid and water of such a strength as to bring the silver and the base metal contents into solution as nitrate compounds, said digestion agent leaving the gold content undissolved. Gold is now removed by filtration. In order to obtain the silver present in the solution, copper or other equivalent precipitating agent is added, and the silver drops out as metallic silver.

It is desired to point out upon treatment of the residue containing iron, silver, copper and gold with nitric acid, as stated, all of the metal components with the exception of gold are dissolved in the nitric acid to form nitrates. Upon filtering through an ashless filter paper, the gold appears on the filter paper, and the latter may be ignited and weighed in, this gold representing the gold content in 100 c. c. of the solution that was used to treat a pound of ore.

If it is desired to determine the iron content of the sample, this may be accomplished by taking another 100 c. c. of a solution produced by treatment of the ore with the reaction mixture comprising potassium iodide, iodine, water and nitric acid, and adding thereto a sufficient quantity of an alkaline metal hydroxide, as for example potassium hydroxide, whereupon there is formed a precipitate containing all of the iron present in the form of hydroxide of iron. This precipitate may be removed by filtering from its liquid menstrum and the iron content of the same recovered.

It is desired to point out that any portion of the pregnant solution resulting from treating the ore with a mixture of potassium iodide, iodine, and nitric acid, or its equivalent mixture, may be used for the determination of one or more metals, as shown in the above reactions or examples; that is separate samples may be taken for separate determinations of specific metals.

If desirable, the iodine compounds used in the process and which produce the metal iodides and other compounds may be recovered from solutions containing the same and metal compounds by introducing the solution into a container and injecting beneath the surface of the solution a stream of chlorine gas which will displace the iodine from all iodides, excepting the alkaline metal iodides. The displaced iodine dissolves in the solution and may be displaced therefrom by boiling the solution and subliming the iodine. The resulting solution is potassium iodide and water, and the soluble chlorides. The latter may be removed by fractional crystallization. The potassium iodide after removal of the chlorides may be brought to its original concentration in water, and the sublimed iodine added to the potassium iodide and water to form part of the constituents of the hereindescribed treatment agent.

It is desired to point out that employing the method herein set forth for the assaying of gold and silver ores, much larger samples may be used than are used in fire assays, and hence a more accurate average result is obtained of the ore which it is desired to test.

The present invention may be used not only to assay ores, concentrates and the like, but may be used to recover the precious metal content and the base metal content of these products. The procedure to be followed is more or less identical with the procedure above outlined, and therefore, it need not again be described in detail.

In general, any material which contains precious metal components which are difficult to assay or to recover, may be treated by the present method, it being pointed out that a complete recovery of the gold and silver content is made when using the method to assay the ore, and that when the method is used for the treatment of ores and like products to recover the gold and silver content, there is a substantially complete recovery.

The accompanying flow sheet diagrammatically indicates the basic steps of the herein disclosed invention.

What I claim is:

1. The herein described method of treating a material having a precious metal-content including gold adapted to be brought into solution with an iodine-containing treatment agent comprising subjecting said material to treatment with said iodine-containing solution agent to form a solution of iodine-containing compounds of the precious metals, treating said solution with mercury whereupon there is produced an amalgam having present a portion of the precious metal-content of the material treated, and a suspended precipitate containing the remaining portion of the precious metals in an unamalgamated condition; and recovering the precious metal-content of the amalgam and the suspended precipitate.

2. The herein described method of treating a material containing a precious metal content together with base metal compounds, said precious metal-content including gold being adapted to be brought into solution with an iodine-containing treatment agent comprising subjecting said material to treatment with said iodine-containing solution agent while subjecting the material to abrasion to bring the gold content of the material being treated into solution, treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

3. The herein described method of treating a refractory tellurium-containing ore having a precious metal-content together with base metal compounds comprising roasting said materials to reduce gold compounds present in the material to a free state whereby they are adapted to be brought into solution with an iodine-containing treatment agent, subjecting the material with said agent to form a solution of iodine-containing compounds of the precious metals, treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

4. The hereindescribed method of treating a material having a precious metal-content including gold adapted to be brought into solution with an iodine-containing treatment medium comprising subjecting said material to treatment with said medium, the latter having present a substance in which the iodine is soluble in the presence of a solvent, and an agent acting to prevent the production of insoluble salts of gold, said treatment-step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

5. The herein described method of treating a material having a precious metal-content including gold adapted to be brought into aqueous solution with an iodine-containing treatment medium comprising subjecting said material to treatment with said medium, the latter having present a metal iodide in which the iodine is soluble in the presence of water, and a metal nitrate acting to prevent the formation of insoluble salts of gold, said treatment step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

6. The herein described method of treating a material having a precious metal-content including gold adapted to be brought into aqueous solution with an iodine-containing treatment medium the latter having present an alkali metal iodide in which the iodine is soluble in the presence of water, and an alkali metal nitrate acting to prevent the production of insoluble salts of gold, said treatment step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

7. The herein described method of treating a material having a precious metal-content including gold adapted to be brought into solution with an iodine-containing treatment medium comprising subjecting said material to treatment with said medium, the latter having present a substance in which the iodine is soluble in the presence of a solvent, hydriodic acid, and an agent acting to prevent the production of insoluble salts of gold, said treatment step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

8. The herein described method of treating a material having a precious metal-content including gold adapted to be brought into aqueous solution with an iodine-containing treatment medium, the latter having present an alkali metal iodide in which the iodine is soluble in the presence of water, hydriodic acid, and an alkali metal nitrate acting to prevent the production of insoluble salts of gold, said treatment-step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

9. The herein described method of treating a material having a precious metal content including gold comprising treating the material with a treatment medium having present iodine, a metal iodide in which the iodine is soluble in the presence of a solvent for the metal iodide, and a metal nitrate acting to prevent the formation of insoluble salts of gold, said treatment step resulting in the production of soluble iodine containing compounds and precious metals, and recovering said precious metals.

10. The herein described method of treating a material having a precious metal content including gold comprising treating the material with a treatment medium having present iodine, a metal iodide in which the iodine is soluble in the presence of a solvent for the metal iodide, hydriodic acid, and a metal nitrate acting to prevent the formation of insoluble salts of gold, said treatment step resulting in the production of soluble iodine containing compounds and precious metals, and recovering said precious metals.

11. The herein described method of treating material having a gold and silver content, comprising subjecting said material to treatment with an iodine containing treatment-agent adapted to bring the gold into solution as an iodide together with a portion of silver as soluble silver iodide, but leaving undissolved silver iodide, bringing said undissolved silver iodide into solution with an iodine-treatment component, treating the resulting solution with mercury whereupon there is produced an amalgam having present a portion of the precious metal content of the material being treated, and a suspended precipitate containing the remaining portion of the precious metals in an unamalgamated condition, and recovering the precious metal content of the amalgam and the suspended precipitate.

12. The herein described method of treating a material having a precious metal-content including gold adapted to be brought into solution with an iodine-containing treatment agent comprising subjecting said material to treatment with said iodine-containing solution agent to form a solution of iodine-containing compounds of the precious metals, treating said solution with mercury whereupon there is produced an amalgam having present a portion of the precious metal-content of the material treated, and a suspended precipitate containing the remaining portion of the precious metals in an unamalgamated condition, treating the amalgam with a strong solution of nitric acid of such a strength as to prevent the formation of colloidal gold adapted to be lost upon filtration, and a filtrate containing base metals and silver, and recovering the so liberated gold and that present in the suspended precipitate.

13. A treatment medium adapted to treat materials having a precious metal content including gold to bring said precious metal content into solution comprising free iodine, a metal iodide in which the free iodine is soluble in the presence of solvent for metal iodide, and a metal nitrate acting to prevent the formation of insoluble salts of gold.

14. A treatment medium adapted to treat materials having a precious metal content including gold to bring said precious metal content into solution comprising free iodine, an alkali metal iodide in which the iodine is soluble in the presence of a solvent for the iodide, hydriodic acid, and an alkali metal nitrate.

15. A treatment medium adapted to treat materials having a precious metal content including gold to bring said precious metal content into solution, comprising free iodine, potassium iodide, a solvent for the potassium iodide, hydriodic acid, and potassium nitrate.

16. A treatment medium adapted to treat materials having a precious metal content including gold to bring said precious metal content into solution, comprising the reaction mixture of an aqueous solution of potassium iodide, hydriodic acid, crystalline iodine, and nitric acid.

17. The herein described method of treating refractory materials having a precious metal content comprising subjecting said material to treatment with iodine dissolved in hydriodic acid, said solution being capable of attacking the refractory material and completely liberating its precious metal content, and recovering the latter.

18. The herein described method of treating a material having a precious metal-content including gold adapted to be brought into solution with an iodine-containing treatment agent comprising subjecting said material to treatment with said iodine-containing solution agent to form a solution of iodine-containing compounds of the precious metals, treating said solution with mercury whereupon there is produced an amalgam having present a portion of the precious metal-content of the material treated, and a suspended precipitate containing the remaining portion of the precious metals in an unamalgamated condition, treating the amalgam with a solution of four parts of concentrated nitric acid and one part of water, cooling the resulting mass, said latter steps preventing the formation of colloidal gold, and recovering the gold liberated by the nitric acid treatment and that present in the suspended precipitate.

19. The hereindescribed method of treating a material having a precious metal-content including gold adapted to be brought into solution with an iodine-containing treatment medium comprising subjecting said material to treatment with said medium, the latter having present a substance in which the iodine is soluble in the presence of a solvent, and a metal nitrate acting to prevent the formation of insoluble salts of gold, said treatment-step resulting in the production of soluble iodine-containing compounds of the precious metals; treating said solution with mercury whereupon there is produced an amalgam having present a portion of the precious metal-content of the material treated, and a suspended precipitate containing the remaining portion of the precious metals in an unamalgamated condition, and recovering the precious metal-content of the amalgam and said suspended precipitate.

GEORGE D. HARRISON.